Patented June 24, 1952

2,601,387

UNITED STATES PATENT OFFICE 2,601,387

PREPARATION OF AMIDES HAVING TERTIARY CARBON ATTACHED TO AMIDO NITROGEN

William F. Gresham and William E. Grigsby, Wilmington, Del., assignors to E. I. du Pont de Nemours & Company, Wilmington, Del., a corporation of Delaware No Drawing. Application November 24, 1948, Serial No. 61,929

7 Claims. (Cl. 260—561)

This invention relates to organic acid amides and particularly to amides containing a tertiary carbon atom attached to an amido nitrogen. The invention also relates to a novel procedure for the preparation of these organic acid amides.

Certain N-tertiary alkyl amides have been prepared heretofore. For example, N-tertiary-butyl acetamide has been prepared by treating pinacoline oxime with $PCl_5$ in ether solution (Scholl, Liebig's Ann. 338, 16 (1905)). In general, the methods which have been employed heretofore for the preparation of N-tertiary alkyl amides have been unattractive from an economic standpoint, and for this reason, among others, it is believed that these compounds have not been available in the past in commercial quantity.

An object of this invention is to provide a simple and economically attractive process for preparing organic acid amides containing a tertiary carbon atom attached to the amido nitrogen. Another object is to provide novel and useful N-tertiary alkyl amides which have not been obtainable by the previously known methods for preparing N-tertiary alkyl amides.

These and other objects of the invention are accomplished by heating a nitrile with a tertiary alcohol, as hereinafter described. In a specific embodiment the invention contemplates treating a nitrile with a tertiary alcohol in the presence of an acidic catalyst to obtain an N-tertiary alkyl amide. This is illustrated by specific reactants in the following equation

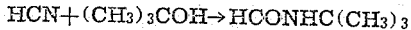
$$HCN + (CH_3)_3COH \rightarrow HCONHC(CH_3)_3$$

The nitriles which may be employed in the practice of this invention include hydrogen cyanide, aliphatic nitriles such as acetonitrile, propionitrile, isobutyronitrile, pivalonitrile, acrylonitrile, methacrylonitrile, aminoacetonitrile, formaldehyde cyanhydrin, cyclohexanone cyanhydrin, trimethylene cyanhydrin, succinonitrile, adiponitrile, other cyanoalkanes, etc. The tertiary alcohols include tertiary butanol, tertiary amyl alcohol, triethyl carbinol, 3-methyl-1,3-butandiol, and the like. The reaction between the nitrile and the tertiary alcohol is preferably conducted in the presence of an acid-reacting catalyst, such as sulfuric acid, hydrochloric acid, phosphoric acid, boron fluoride hydrate, ammonium bisulfate and similar acidic materials. However, the reaction takes place to some extent in the absence of added catalyst. The concentration of the acid-reacting catalyst may be about 1 to 20%, preferably 5 to 10% of the weight of water employed.

In the practice of this invention it is generally preferable to heat the tertiary alcohol with the nitrile in the presence of the acidic catalyst, suitably in an autoclave under an autogenous pressure within the range of from atmospheric to about 1000 pounds per square inch. Higher pressures may be employed but these are generally unnecessary. The reaction takes place conveniently at a temperature of about 50° to 250° C., preferably about 90° to 175° C., but lower temperatures may be employed. When a concentrated acid catalyst is used, the reaction temperature may be as low as 0° C., or even lower, but higher temperatures are preferred when dilute acid catalysts (up to 20% concentration in water) are used. Upon completion of the reaction, the resultant amide may be removed from the reaction mixture by any convenient method such as distillation, crystallization, extraction or the like.

The invention is further illustrated by means of the following examples in which parts are by weight except as otherwise stated.

*Example 1.*—A mixture containing 148 parts of tertiary butanol, 54 parts of hydrogen cyanide and 4 parts of sulfuric acid was heated at a temperature of 135° under autogenous pressure for 4 hours in an autoclave which was equipped with a rupture disk capable of withstanding a pressure of 100 atmospheres. The resultant mixture was withdrawn from the autoclave, and was transferred to a still for recovery of isobutylene, hydrogen cyanide, and tertiary butanol. The distillation was then continued at diminished pressure, (9 millimeters) yielding 15.1 parts of a water soluble liquid distillate (13.3, 13.4% N) at 79° to 83° C., followed by 3.8 parts of similar material (14.1% N), which distilled at about the same temperature and pressure.

This corresponds to 10% conversion of tertiary butanol to N-tertiary butyl formamide (% N, calc. for $HCONHC_4H_9$, 13.86%).

*Example 2.*—To a solution of 1,1,10,10-tetramethyldecanediol-1,10 (0.005 mole, 1.15 grams) and adiponitrile (0.005 mole, 0.54 gram) in 3 cc. glacial acetic acid was added 1 cc. 100% $H_2SO_4$. The reaction was exothermic and after 3 hours at 30° C. the viscous reaction mixture was poured into water. The resulting sticky polymer was separated by decantation, after which the polymer was dissolved in alcohol and precipitated by pouring the alcohol solution into water. The resulting white powder (weight about one gram) was separated by filtration, and dried. It melted on a spatula at 80° to 100° C., and silky brittle fibers could be manually spun therefrom. This polyamide gave nitrogen analyses 8.40 and 8.33%, the calculated value for —CO—(CH$_2$)$_4$—CO—NH—C(CH$_3$)$_2$(CH$_2$)$_8$C(CH$_3$)$_2$—NH— being 8.30%.

*Example 3.*—A mixture containing 88.5 parts of tertiary amyl alcohol, 40.9 parts of acetonitrile, 18.4 parts of water and 2 parts of sulfuric acid was heated at a temperature of 130° to 140° C. for 2 hours under pressure of 150 to 225 pounds per square inch. The resultant product, which was a colorless liquid, was transferred to a still and the volatile constituents were removed up to a temperature of 52° C. at 108 millimeters. The solid residue was recrystallized from benzene, yielding N-tertiary amyl acetamide, M. P., 77° to 78° C. Analysis: Found 10.1% N; cal. for CH$_3$CONHC$_5$H$_{11}$, 10.85% N.

*Example 4.*—A mixture containing 148 parts of tertiary butyl alcohol and 54 parts of commercial hydrogen cyanide was heated in the absence of an added catalyst for 4 hours at 135° C. under autogenous pressure in an autoclave which was equipped with a rupture disk capable of withstanding a pressure of 100 atmospheres. Distillation of the resultant product gave 3.3 parts of N-tertiary butyl formamide, B. P., 89° at 14 millimeters pressure.

*Example 5.*—To a mixture of HCN (1 mole, 27 grams), tertiary butyl alcohol (1 mole, 74 grams), and 200 c. c. glacial acetic acid was added 54 c. c. (1 mole) of 100% H$_2$SO$_4$ in 100 c. c. glacial acetic acid. The resulting mixture was stirred for 4 hours at 15° to 20° C., after which it was poured into water, neutralized, and extracted with ether. Distillation of the ether extract gave a 50% yield of N-tertiary butyl formamide, B. P. 82° C. at 8 mm., $n_D^{25}=1.4307$.

These examples are intended to be illustrative only, since various modifications in the general method herein disclosed will occur to those skilled in the art. For example, the N-tertiary alkyl amide need not necessarily be removed from the reaction mixture as such, but acid hydrolysis thereof may be allowed to proceed until the amide is converted partially or completely to the corresponding carboxylic acid. Alternatively, the reaction products herein described may be heated in the presence of aqueous alkali, whereby conversion to the corresponding amine takes place. When this is done, the tertiary alkyl amine can generally be distilled directly from the reaction mixture.

The reaction between the nitrile and tertiary alcohol may be conducted either batchwise or continuously. Any suitable apparatus, such as an autoclave made of or lined with corrosion resistant materials such as glass, enamel, lead, copper, silver, nickel, stainless steel, and the like, may be employed.

The herein described organic acid amides containing a tertiary carbon atom attached to the amido group are useful as solvents, plasticizers, glycerine substitutes, resin intermediates, and agents for selectively absorbing acetylene from hydrocarbon gases.

It will be understood that many widely different embodiments of the present invention may be made without departing from the spirit and scope thereof and accordingly we do not limit ourselves except as set forth in the appended claims.

This application is a continuation-in-part of our copending application Serial No. 538,342, filed June 1, 1944, now U. S. Patent 2,457,660.

We claim:
1. A process for the synthesis of organic acid amides having a tertiary carbon atom attached to an amido nitrogen which comprises subjecting a nitrile of the class consisting of HCN and cyanoalkanes to reaction under acidic conditions with a saturated tertiary alcohol, whereby a reaction mixture containing an organic acid amide having a tertiary carbon atom attached to the amido nitrogen is obtained.

2. A process for the synthesis of organic acid amides having a tertiary carbon atom attached to an amido nitrogen which comprises subjecting a cyanoalkane to reaction with a tertiary alcohol in an aqueous acid medium, whereby a reaction mixture containing an organic acid amide having a tertiary carbon atom attached to the amido nitrogen is obtained.

3. A process for the synthesis of N-tertiary alkyl formamide which comprises subjecting hydrogen cyanide to reaction with a tertiary alkanol in an aqueous acid medium and separating N-tertiary alkyl formamide from the resulting reaction mixture.

4. A process for the synthesis of N-tertiary alkyl formamide which comprises subjecting hydrogen cyanide to reaction with a tertiary alkanol in the presence of an acidic catalyst at a temperature in the range of about 50° to 250° C., and separating N-tertiary alkyl formamide from the resulting reaction mixture.

5. A process for the synthesis of N-tertiary alkyl formamide which comprises subjecting hydrogen cyanide to reaction in an aqueous acid medium with a tertiary alkanol at a temperature in the range of about 50° to 250° C., and at a pressure in the range of from atmospheric pressure to about 1000 pounds per square inch, and separating N-tertiary alkyl formamide from the resulting reaction mixture.

6. A process for the synthesis of N-tertiary butyl amides which comprises subjecting a cyanoalkane to reaction with tertiary butyl alcohol in an aqueous acid medium at a temperature in the range of about 50° to 250° C., and at a pressure in the range of from atmospheric pressure to about 1000 pounds per square inch and separating N-tertiary butyl amide from the resulting reaction mixture.

7. A process for the synthesis of N-tertiary butyl formamide which comprises reacting hydrogen cyanide with tertiary butanol in an aqueous acid medium at a temperature in the range of about 50° to 250° C., and at a pressure in the range of from atmospheric pressure to about 1000 pounds per square inch and separating N-tertiary butyl formamide from the reaction mixture.

WILLIAM F. GRESHAM.
WILLIAM E. GRIGSBY.

REFERENCES CITED

The following references are of record in the file of this patent:

UNITED STATES PATENTS

| Number | Name | Date |
|---|---|---|
| 2,320,089 | Lichty | May 25, 1943 |
| 2,457,660 | Gresham et al. | Dec. 28, 1948 |
| 2,461,509 | Harvey | Feb. 15, 1949 |
| 2,518,156 | Magat | Aug. 8, 1950 |
| 2,573,673 | Ritter | Oct. 30, 1951 |